No. 674,324. Patented May 14, 1901.
G. W. TROMMLITZ.
COMBINED LEVEL AND INCLINOMETER.
(Application filed Dec. 1, 1898. Renewed Feb. 9, 1901.)

(No Model.) 2 Sheets—Sheet 1.

Witnesses
Inventor
Geo. W. Trommlitz
By his Attorney

No. 674,324. Patented May 14, 1901.
G. W. TROMMLITZ.
COMBINED LEVEL AND INCLINOMETER.
(Application filed Dec. 1, 1898. Renewed Feb. 9, 1901.)
(No Model.) 2 Sheets—Sheet 2.
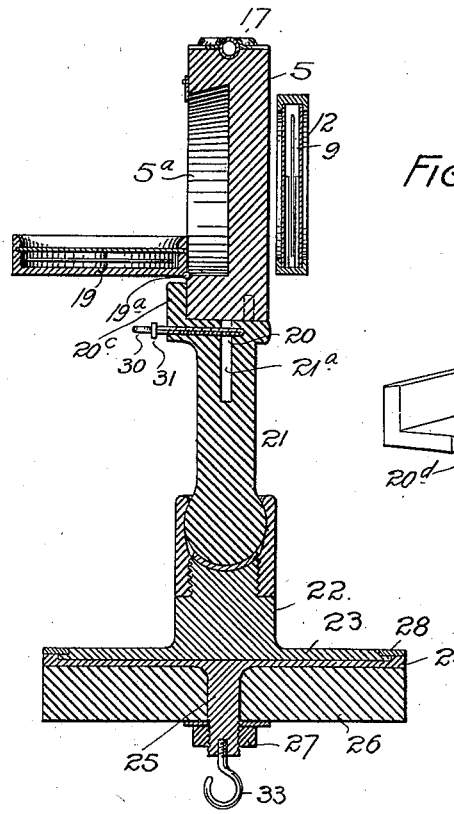
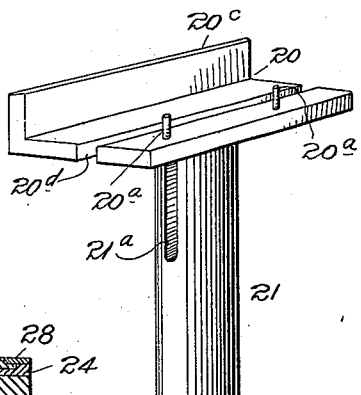
FIG. 3.
FIG. 5.
FIG. 4.
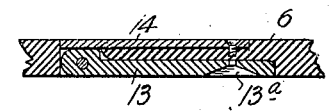
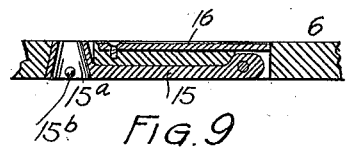
FIG. 7.
FIG. 9.
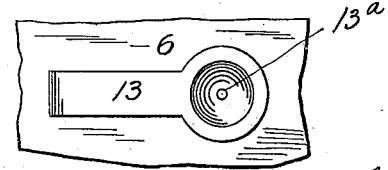
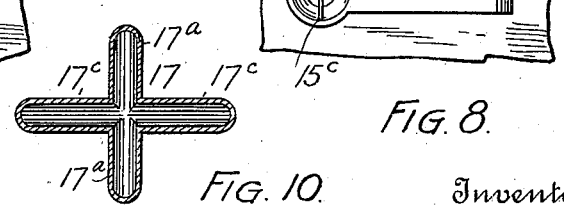
FIG. 6.
FIG. 8.
FIG. 10.
Witnesses
Inventor
Geo. W. Trommlitz
By his Attorney
THE NORRIS PETERS CO., PHOTO-LITHO., WASHINGTON, D. C.

UNITED STATES PATENT OFFICE.

GEORGE W. TROMMLITZ, OF DENVER, COLORADO, ASSIGNOR TO GEORGE K. BROWN, OF SAME PLACE.

COMBINED LEVEL AND INCLINOMETER.

SPECIFICATION forming part of Letters Patent No. 674,324, dated May 14, 1901.

Application filed December 1, 1898. Renewed February 9, 1901. Serial No. 46,736. (No model.)

*To all whom it may concern:*

Be it known that I, GEORGE W. TROMMLITZ, a citizen of the United States of America, residing at Denver, in the county of Arapahoe and State of Colorado, have invented certain new and useful Improvements in a Combined Level and Inclinometer; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in a combined level and inclinometer, being an instrument intended to take the place of the surveyor's transit, my object being to provide an instrument of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is an embodiment thereof.

Figure 1:
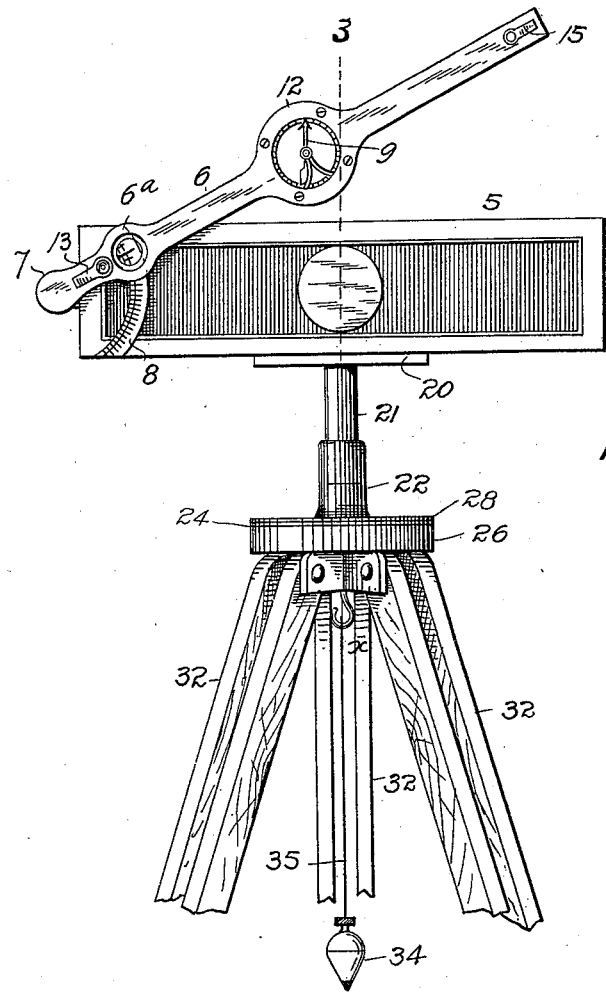
Figure 2:
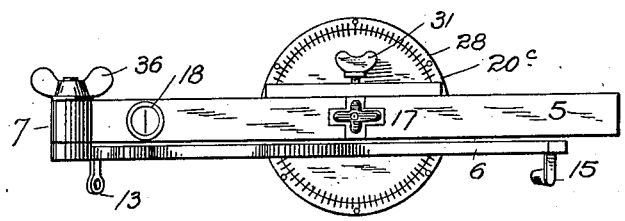

In the drawings, Figure 1 is a front elevation of my improvement mounted on a tripod, the hinged arm being raised from the horizontal position. Fig. 2 is a top view of the same. Fig. 3 is a vertical section taken on the line 3 3, Fig. 1, the hinged arm being in a horizontal position and the parts shown on a larger scale. Fig. 4 is a perspective view of the clamping-stem upon which the level-bar is mounted shown on a larger scale. Fig. 5 is a cross-section taken through the center of the hinged arm containing the gravity needle or pointer. Fig. 6 is a fragmentary view of the peep-sight end of the hinged bar, the sight being closed. Fig. 7 is a section taken through the same. Fig. 8 is a similar view of the globe-sight extremity of the bar, the sight being closed. Fig. 9 is a section taken through the same. Fig. 10 is a horizontal section taken through my improved cross-level device, shown in detail and on a larger scale than in Fig. 2.

Similar reference characters indicating corresponding parts in the views, let the numeral 5 designate the level-bar, to one end of which is hinged an arm 6 at a point 7 and in such a manner that the arm may be moved up or down from the horizontal position. Adjacent the hinged extremity of the arm 6 is formed an opening, into which projects a pointer made fast to the arm and arranged to travel in close proximity to the graduated face of a quadrant-plate 8, attached to the level-bar 5. In the center of the arm 6, which contains a circular opening for the purpose, is pivotally mounted a gravity needle or pointer 9, inclosed by two glass disks 10 and adapted to move around the graduated faces 12 of the bar as the latter is turned on its hinges. This needle points out in degrees on the said graduated faces the angle of inclination or declination of the hinged arm. The needle-spindle is mounted in jewels, whereby its movement becomes delicate and accurate as the arm is moved. Its lower extremity is weighted in order to maintain its perpendicularity under all circumstances. The position of the needle may be observed and read in degrees from either side of the instrument, since the arm is graduated on both sides.

The extremity of the arm adjacent the hinge is provided with a hinged peep-sight 13, which may be closed, as shown in Figs. 1, 6, and 7, or opened, as shown in Fig. 2. This sight is eccentrically hinged and engaged by a leaf-spring 14, whose function is to maintain it in either position of adjustment. The opposite extremity of the arm is provided with a globe-sight 15, which is arranged substantially the same as the peep-sight, being held in position by a spring 16. The peep-sight is provided with a small opening $13^a$, which when the two sights are open is in line with the ball $15^b$, occupying a position in the center of the globe-sight opening and supported by an arm $15^c$. In the center of the top of the level-bar is placed a glass receptacle having the form of a cross, whose members are placed at right angles to each other. Hence the receptacle has four arms, all communicating with a common center where the lines of the arms intersect. When the liquid is placed in this receptacle, it circulates freely therein. When the air-bubble is at the center of the level-bar, the latter is in a horizontal position both longitudinally and transversely. If while the bar is in a horizontal position longitudinally it be transversely tilted or inclined, the air-bubble will pass into one of the transverse arms 17ᵃ of the receptacle. Again, if while the bar is still in a horizontal position transversely one end of it be raised, giving it a longitudinal inclination, the air-bubble will pass into one of the arms 17ᶜ of the receptacle.

The upper end of the bar 5 is provided with a compass 18. This bar is also provided with a recess 5ᵃ to receive a compass 19, which is hinged to the bar, as shown at 19ᵃ. This compass 19 when in use is open to the position shown in Fig. 3. When not in use, it occupies the recess 5ᵃ, in which it is concealed.

The bar 5 is supported upon a shelf 20, which is formed integral with a stem 21, whose lower extremity is ball-shaped to fit a counterpart socket formed in a short column 22, mounted on a plate 23, adapted to turn on a plate 24, which is provided with a depending stem 25, passing through an opening formed in a base 26 and locked in place by a nut 27, screwed upon the stem against a washer engaging the base. The outer edges of the plates 23 and 24 are oppositely shouldered, and the two plates are connected by a flat ring 28, having a graduated face provided with marks indicating degrees. By observing the compass and turning the pedestal 23 a line forming any desired angle with a given direction may be projected. The ring 28 is made fast to the plate 24. Hence by regulating the nut 27 the plate 23 may be permitted to turn more or less freely as desired. The shelf 20 is provided with two pins 20ᵃ, adapted to engage openings formed in the lower edge of the level-bar 5. The plate 20 is also provided with a vertical flange 20ᶜ, adapted to engage one side of the bar 5 when the pins 20ᵃ are in the sockets of the bar. Between the flange 20ᶜ and the pins 20ᵃ the shelf 20 and the stem 21 are provided with registering slots 20ᵈ and 21ᵃ. Passed into the shelf and intersecting the slot 20ᵇ is a bolt 30, upon whose protruding extremity is secured a thumb-nut 31. It is evident that by tightening this nut the bar 5 is tightened on the shelf, while when this nut is loose the bar may be easily lifted from the shelf.

By reason of the ball-and-socket connection between the stem 21 and the pedestal 22 the bar 5 may be leveled regardless of the position of the tripod-legs 32, upon which a base 26 is mounted. The stem 25 is provided with a hook 23, to which a plumb-bob 34 may be attached by means of a cord 35.

In the use of the instrument the level-bar 5 is adjusted to occupy a horizontal position by means of the spirit-level 17. Then if it is desired to ascertain the angle of an elevation the arm 6 is raised and the two sights opened, as shown in Fig. 2.

The arm 6 is so adjusted that the elevated point is observed through the sights. The needle in the opening 6ᵃ of the arm will then indicate the degree of the angle on the graduated plate 8. The needle 9 will also indicate the same thing on the graduated faces of the ring 12 of the arm 6, thus giving two readings, one of which is a check upon the other. Any angle of declination may be found in the same manner by lowering the arm from its horizontal position.

The arm 6 when properly adjusted is secured in position by a thumb-nut 36, by means of which the arm may also be given more or less freedom of movement, as desired.

Having thus described my invention, what I claim is—

1. The combination with a level-bar, of a shelf upon which the bar is mounted; said shelf being provided with an upwardly-projecting flange, pins engaging sockets in the bar and a depending stem, the shelf and stem being slotted between the pins and the flange, and the bolt entering the shelf and intersecting the slot and provided with an adjusting-nut.

2. A level-bar provided with a recess formed in one side thereof, and a compass hinged on the bar and adapted to fold into said recess.

3. The combination of a level-bar provided with a recess formed in one side thereof, a compass hinged to said bar and adapted to fold into said recess, an arm hinged to one end of the bar on the side opposite from the compass, the central portion of the arm being provided with a circular opening surrounded by a graduated face, and a needle or pointer centrally pivoted in said opening and weighted to maintain a vertical position as the arm is operated.

4. The combination of a level-bar, an arm hinged to one extremity of said bar and provided with a central opening, a gravity-needle located in said opening and observable from both sides of the instrument, a shelf upon which the level-bar is mounted and suitably fastened, said shelf being provided with a depending stem having a ball-shaped lower extremity, a column having a socket adapted to receive the ball extremity of said stem, the lower extremity of said column terminating in a plate, another plate upon which the last-named plate rests and is adapted to turn, overlapping the other plate, whereby a graduated ring attached to one plate and the two plates are held in operative position, a tripod-supported base having an opening through which a stem formed on the lower plate passes, the lower extremity of said stem being threaded to receive a nut, whereby the said superstructure is securely fastened to the base.

In testimony whereof I affix my signature in presence of two witnesses.

GEORGE W. TROMMLITZ.

Witnesses:
A. J. O'BRIEN,
BERNICE C. CAUGHEY.